A. BURGER.
FILTER PRESS.
APPLICATION FILED APR. 8, 1911.
1,112,674.
Patented Oct. 6, 1914.
2 SHEETS—SHEET 1.
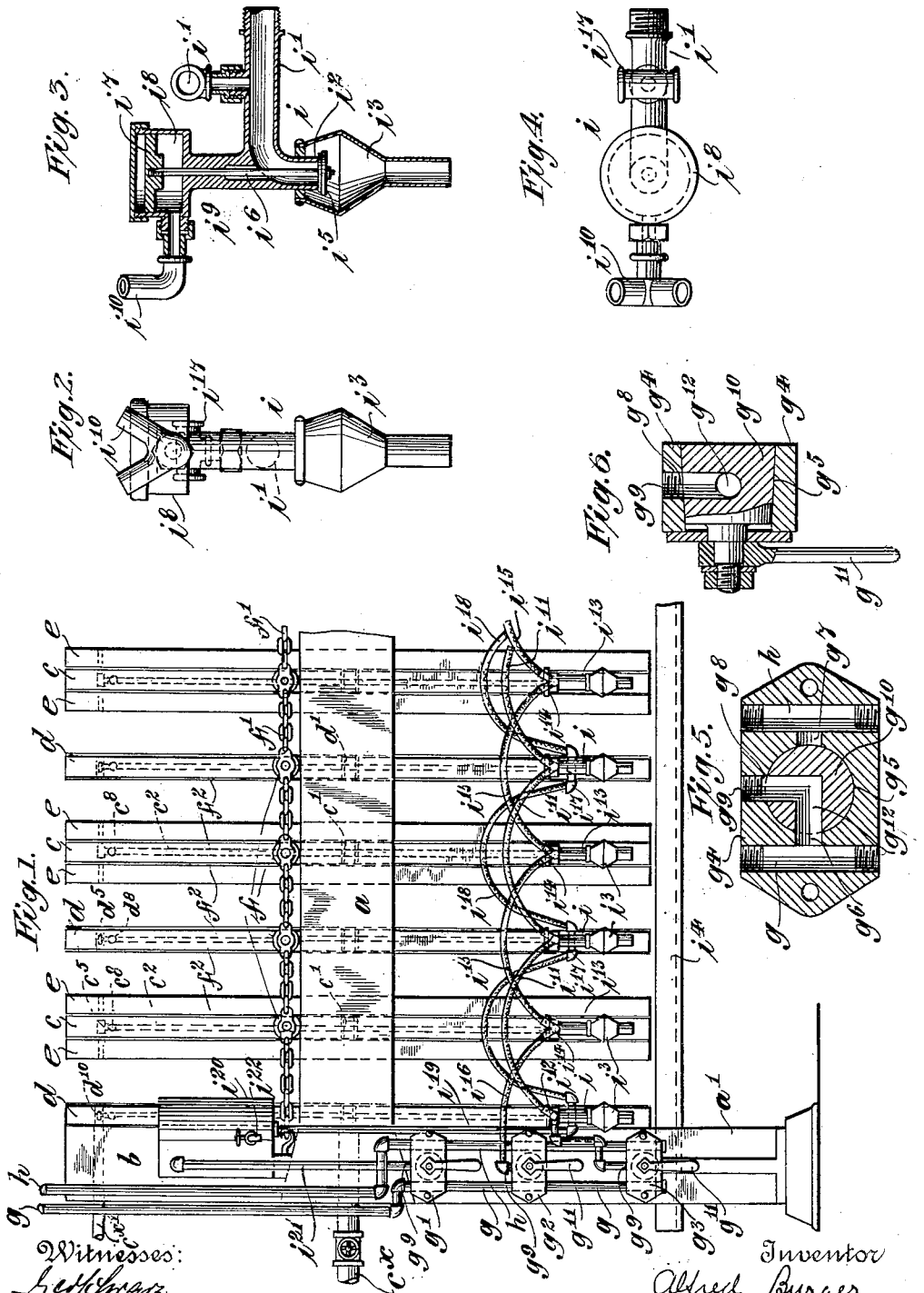

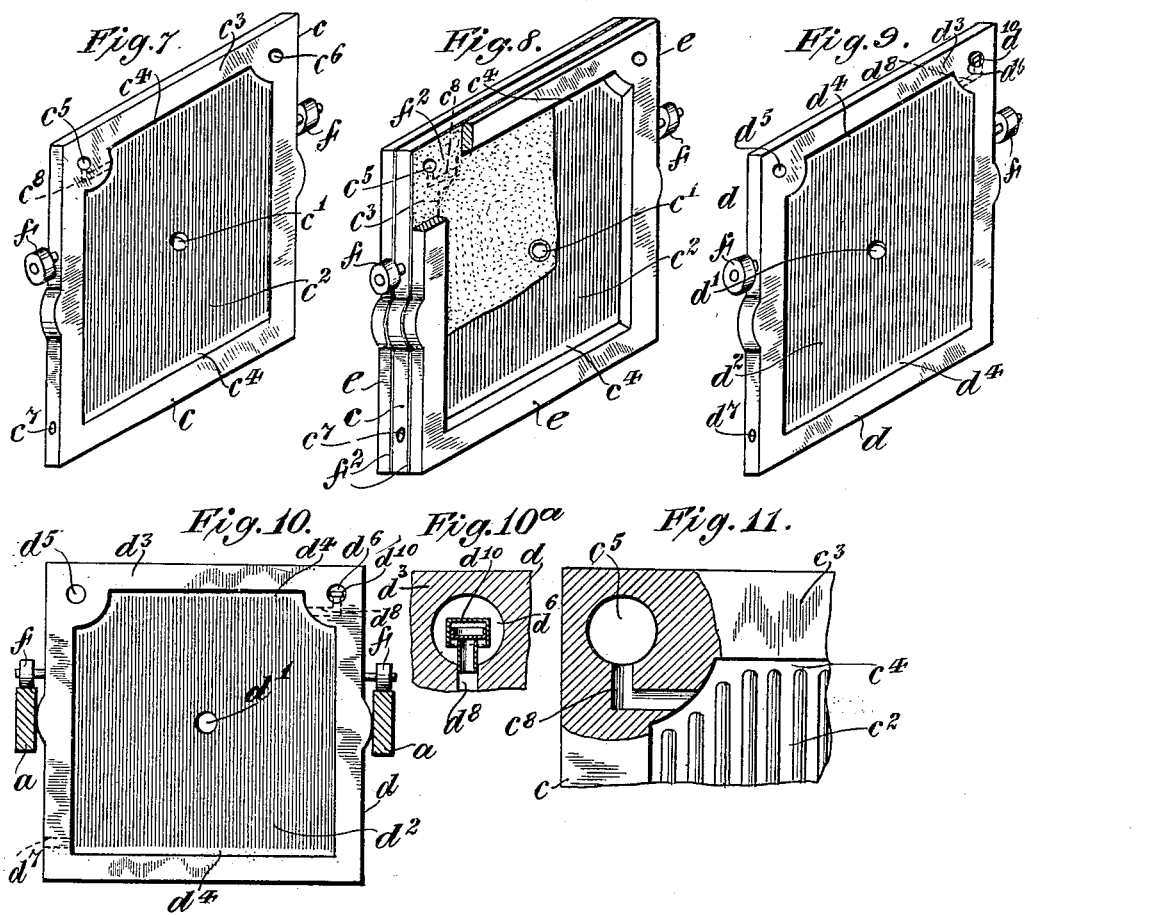

UNITED STATES PATENT OFFICE.

ALFRED BURGER, OF NEW BRIGHTON, NEW YORK.

FILTER-PRESS.

1,112,674.  Specification of Letters Patent.  Patented Oct. 6, 1914.

Application filed April 8, 1911. Serial No. 619,699.

*To all whom it may concern:*

Be it known that I, ALFRED BURGER, a citizen of Switzerland, residing at New Brighton, in the borough of Richmond of the city of New York, in the State of New York, have invented certain new and useful Improvements in Filter-Presses, of which the following is a specification, reference being had to the accompanying drawings, forming a part hereof.

This invention relates to filter presses such as are employed in the separation of soluble substances from insoluble substances and in which the material to be treated is delivered to the filter presses in a liquid or semi-liquid condition. In the operation of filter presses heretofore constructed for such purposes much time is consumed in the manipulation of the filter presses in discharging the filter cake or residue and in preparing the filter for a new operation, whereby the capacity or productiveness of the filter for a given period of time is considerably reduced, while the operations of washing out such soluble substances as remain in the filter cake after the first run and of loosening the filter cakes preparatory to their removal have also required considerable time. Furthermore, it has been necessary to remove the filter cloths at frequent intervals and to wash them out before they can be used again.

The object of this invention is to prevent the loss of time and of labor which hitherto has been incidental to the use of such filter presses and to provide means whereby the manipulation of the filter press, in carrying on the washing of the filter cakes, is greatly facilitated and is performed largely by mechanical devices. Furthermore, the provisions for washing the filter cakes have been improved so that the wash water can be directed through the filter cakes and through the cloths which incase them from either direction, whereby each cloth through which, in one operation, the wash water passes from the filter cake may be in the next operation the cloth through which the wash water passes into the filter cake. The cloth which receives water from the filter cake naturally receives a considerable deposit of insoluble matter and when, at the next operation, the water passes through such cloth into the filter cake, such insoluble matter is washed out of the cloth into the filter cake. In this manner the removal of the cloths for washing at frequent intervals becomes unnecessary.

A further object is generally to improve the construction and operation of filter presses of the kind referred to.

The invention will be more fully explained hereinafter with reference to the accompanying drawings in which it is illustrated and in which—

Figure 1 is a view in elevation of the left hand portion of the filter press. Figs. 2, 3 and 4 are detail views in front elevation, vertical section and plan of the outlet cock which is shown applied to each of the single or intermediate filter plates in Fig. 1. Figs. 5 and 6 are detail views in section of one of the cocks for controlling the flow of air. Fig. 7 is a view in perspective of one of the filter plates to which the frames are applied, a portion of the filter cloth being also shown. Fig. 8 is a view in perspective of such a plate as that shown in Fig. 7 and its frames assembled. Fig. 9 is a view in perspective of one of the single or intermediate filter plates. Fig. 10 is a view in elevation of one of the single or intermediate plates. Fig. 10$^a$ is a detail view on a larger scale of the valve employed in the plate shown in Fig. 10. Fig. 11 is a detail view, partly in section, showing a portion of one of the plates shown in Figs. 7, 8 and 9.

The improved filter press may comprise, as usual, a stationary end plate or head $b$, filter plates $c$, which, for convenience, may be termed main filter plates, filter plates $d$, which, for convenience, may be termed intermediate or single filter plates, and frames $e$ which are placed between the filter plates and are at least temporarily connected to the main filter plates $c$ so as to move therewith. All of the filter plates are provided with rollers $f$ by which the filter plates are movably supported and are connected by flexible connections $f'$ which, at the ends of the series, are connected to the stationary head $b$ so that the plates may be separated and the filter opened as usual and as represented in Fig. 1. Filter cloths, indicated at $f^2$, are applied to the filter plates in the usual manner, the two cloths on opposite sides of each filter plate being connected by a cloth tube so as to connect the two cloths through the central aperture $c'$ and $d'$, as the case may be, in the respective plates proper, $c^2$ and $d^2$, while the edges of the cloths are clamped between the frames $c^3$ and $d^3$ respectively, which support the plates proper $c^2$ and $d^2$. These plates proper are formed as usual of metal which may be corrugated vertically or otherwise formed, as is usual, to facilitate the flow of the liquor between the plates and the filter cakes, each plate being left smooth near its top and near its bottom, as at $c^4$ and $d^4$, to form an upper channel for the distribution of the wash water across the face of the plate and a lower channel for the collection and conduction to the outlet of the liquor from the filter cakes. The central orifices $c'$ and $d'$ form a central passage through the series of plates by means of which the material to be filtered is forced from a pipe $c^x$ into the chambers of the filter plates, between the plates and between the cloths to fill such chambers completely under the proper pressure at which the material is supplied from a pump or other suitable source. The plates proper $c^2$ and $d^2$, as already indicated, are supported in plate frames $c^3$ and $d^3$, and between the plate frames $c^3$ and $d^3$ are placed, as usual, the frames $e$, by which chambers of sufficient capacity are formed between the plates proper.

Each of the plate frames and intermediate frames is provided, in one upper corner with a passage $c^5$ and $d^5$, as the case may be, which passages $c^5$, $d^5$ form a continuous passage throughout the series of plates when the filter press is closed. Each of the plate frames and intermediate frames is also formed in the other upper corner with passages $c^6$ and $d^6$, as the case may be, which passages also form a continuous passage throughout the series of plates when the filter press is closed. Each of the plate frames $c^3$ and $d^3$, is also provided at one of the lower corners with an outlet $c^7$ or $d^7$, as the case may be, for the discharge of the liquor, such outlet being provided with a cock as hereinafter described.

From the passage $c^5$ of each plate frame $c^3$ the wash water, which is supplied from any suitable source through a pipe $c^{x1}$ at the end of the series, is conducted through a channel $c^8$ and is discharged on both sides of the plate proper $c^2$. Similarly, the wash water which is supplied from any suitable source to the continuous passage formed by the passages $d^6$ and $c^6$, is conducted from each passage $d^6$ and discharged on both sides of the plate proper by a passage $d^8$. It will now be seen that the wash water may be introduced through the plate frame $c^3$ at one side of each of the filter cakes, with its filter cloths, and may be introduced through the plate frames $d^3$ at the other side of each of the filter cakes with its filter cloths. By thus introducing the wash water in alternation from opposite sides of the filter cakes, in successive operations, the filter cloths which in one operation receive and retain more or less insoluble matter from the filter cake, at the next operation have such insoluble matter washed back into the filter cake. The present necessity of washing the filter cloths at frequent intervals is thus avoided.

It is usual to provide each filter plate with a cock to control the outlet therefrom, and in accordance with the usual practice the operator manipulates one cock after another, thus consuming considerable time. By the present invention, provision is made for opening or closing an entire series of cocks from one point, without in any way interfering with the separation of the plates in the opening of the filter. Furthermore, by reason of the provision of means for introducing the wash water at one side of the filter cakes in one operation and at the other side in another operation, it is also desirable to divide the cocks of the filter plates into two series and to provide independent means for controlling the cocks of the two series. The cocks may be most conveniently operated by air pressure or suction, and for this purpose connection may be made through a pipe $g$, to a source of air under pressure above atmospheric, and through a pipe $h$, to a source of air under pressure below atmospheric, or a pressure pipe and a suction pipe. These two pipes are provided with suitable connections whereby each series of cocks may be connected to one pipe or the other and also whereby either series of plates may be connected to the suction pipe for the purpose of placing the cakes under suction.

As shown in Figs. 1, 5 and 6, the connections of the pressure and suction lines $g$ and $h$ are controlled by valves $g'$, $g^2$ and $g^3$. The construction of each of these valves may be as shown in detail in Figs. 5 and 6. The continuations of the pressure and suction lines $g$ and $h$ through the valve bodies, one of which is shown at $g^4$ in Figs. 5 and 6, indicated by the same reference letters $g$ and $h$ in Fig. 5. Each valve body is provided with a valve chamber $g^5$, which is adapted to communicate through passages $g^6$, $g^7$ and $g^8$ with the pressure line $g$, the suction line $h$, and a port $g^9$. In the valve chamber is a valve plug $g^{10}$, provided with a suitable operating handle $g^{11}$ and having a channel $g^{12}$. By proper manipulation of the valve the intermediate port $g^9$ can be placed in communication with the pressure line $g$ or the suction line $h$, or all of the passages can be blanked. The connections from the ports $g^9$ of the several valves $g'$, $g^2$ and $g^3$ will be explained hereinafter. The cock which is applied to each of the single or intermediate filter plates $d$, is shown in position at $i$ in Fig. 1, while the construction thereof is shown in detail in Figs. 2, 3 and 4. As there shown, such cock comprises a body $i''$ which may be threaded into the outlet $d^7$ of the filter plate frame and is provided with a valve seat at $i^2$ and with a hood $i^3$ through which the liquor is directed into the usual trough $i^4$ into which the liquor from all of the filter plates is discharged. The outlet of the cock is controlled by a valve plug $i^5$ carried by the stem $i^6$ of a piston $i^7$. The latter is located in a cylinder $i^8$ which may be connected, through a port $i^9$, with the pressure line $g$ or the suction line $h$. In order that all of the several cocks $i$ may be connected to the pressure line or to the suction line as desired, the port $i^9$ is provided with a twin coupling $i^{10}$ and connection is made from the twin coupling of one cock to the twin coupling of the next by a flexible hose $i^{11}$, and from the coupling $i^{12}$ of the cock $i$ nearest to the fixed head $b$, by any suitable connection, to the port $g^5$ of the valve $g^3$, so that through manipulation of the valve $g^3$ all of the cylinders $i^8$ of the cocks $i$ may be connected either to the pressure line or to the suction line. The outlet $c^7$ of each of the filter plate frames $c^3$ has applied thereto a cock $i^{13}$ which is identical in construction with the cock $i$, as thus far described, the twin couplings $i^{14}$ of the cocks $i^{13}$ being connected with each other by flexible connections $i^{15}$, while the coupling of the cock on the filter plate frame $c^3$ nearest the stationary head $b$, is connected by a flexible connection $i^{16}$ with the port $g^5$ of the valve $g^2$, so that through proper manipulation of the valve $g^2$, the cylinders $i^8$ of all of the cocks $i^{13}$ of the filter plate $c$, may be connected either to the pressure line or to the suction line.

It is desirable to provide means whereby the filter cakes may be subjected to suction to hold them in position against the plates, during the opening, until the plates have been separated far enough to permit of the removal of the cakes. For this purpose it is sufficient that the alternate filter plate frames be provided with connections whereby such suction may be applied. As shown in the drawings the single or intermediate filter plates $d$ are thus provided, and accordingly the cocks $i$ of these filter plates are provided with T-couplings $i^{17}$, the several couplings being connected with each other by flexible connections $i^{18}$ while the coupling of the cock nearest the stationary head $b$ is connected on one side, by a pipe $i^{19}$, with the lower end of a trap tank $i^{20}$. The upper end of this trap tank is connected by a pipe $i^{21}$ with the port $g^9$ of the valve $g'$, so that by proper manipulation of the valve $g'$, the several cocks $i$ and through them the corresponding filter plate chambers may be connected with the suction line $h$ and such liquor as remains in the cakes be thereby drawn into the trap tank $i^{20}$, from which it may be discharged, as it accumulates, through a cock $i^{22}$ or returned to the filter cakes at the next operation by air pressure supplied through connection, in a similar manner, to the pressure line $g$.

In order that the suction applied through the connections $i^{17}$, $i^{18}$, may be exerted through the filter cakes so as to draw out of them such liquor as remains therein, it is necessary to close the inlet at the top of the frames $d^3$ to which such connections are applied. Accordingly, there is provided for the passage $d^8$ of such frame $d^3$ a suction valve $d^{10}$ which may be of any suitable construction, such as that indicated in Fig. 10$^a$, so that it will lift when the wash water is forced in, to admit it from the aperture $d^6$ to the passage $d^8$, and will close the passage $d^8$ when suction is applied through the outlet $d^7$ at the bottom of the frame.

Through the connection of the cylinders $i^8$ with the pressure line or the suction line, as may be desired, the pistons $i^7$ are drawn down to move the valves $i^5$ away from their seats and open the cocks or are moved upward, to move the valves $i^5$ against their seats, to close the cocks. If the wash water is admitted to the filter chambers through the filter plate frames $c^3$ then the cocks $i^{13}$ are closed and the cocks $i$ are open, while if the wash water is admitted through the filter plate frames $d^3$ the cocks $i$ are closed and the cocks $i^{13}$ are open. In this manner the necessary manipulation of all of the cocks is effected at one time through the proper manipulation of the valves $g^2$ and $g^3$, and the time required hitherto for the separate manipulation of the cocks of the filter plates by hand is saved. The flexible connections between the several cocks permit the necessary movement of the filter plates in the opening and closing of the filter plates.

It will be understood that various changes may be made in the details of construction and arrangement of the various parts of the filter press to suit different conditions of use and that the invention, therefore, is not limited to the particular construction shown and described herein.

I claim as my invention:

1. In a filter press, the combination of a series of relatively movable plates and frames forming filter chambers, cocks for said chambers respectively, a common means for opening and closing said cocks, and flexible connections from the several cocks to said common means, whereby all of said cocks may be opened and closed from one point.

2. In a filter press, the combination of a series of relatively movable plates and frames forming filter chambers, cocks for said chambers respectively, said cocks comprising each a valve and a pneumatic valve operating device, a common pneumatic controlling device, and connections from the several pneumatic operating devices to said common controlling device.

3. In a filter press, the combination of a series of plates and frames forming filter chambers, cocks for the filter chambers respectively, each cock comprising a valve and a pneumatic valve operating device, a suction line, a pressure line, a valve adapted to control communication with the suction line and the pressure line, and connections from the several pneumatic valve operating devices to said controlling valve.

4. In a filter press, the combination of a series of relatively movable plates and frames forming filter chambers, means to introduce wash water at one side or at the other of each filter cake, cocks communicating with the chambers between the several cakes, means to open or close simultaneously the cocks of alternating chambers, and means to open or close simultaneously the cocks of the intermediate chambers, whereby the wash water may be directed through the filter cakes from one side thereof or from the other.

5. In a filter press, the combination of a series of relatively movable plates and frames forming filter chambers, cocks for said filter chambers, each cock comprising an air cylinder and a piston and a valve operated by the piston, a suction line, a pressure line, a valve to control communication with the suction line or the pressure line, and connections from the several air cylinders of the cocks to said controlling valve, whereby the several cock valves of the series may be opened or closed together.

This specification signed and witnessed this 3d day of April, 1911.

ALFRED BURGER.

Signed in the presence of—
 AMBROSE L. O'SHEA,
 ELLA J. KRUGER.

---

Copies of this patent may be obtained for five cents each, by addressing the "Commissioner of Patents, Washington, D. C."